(12) United States Patent
Moyal et al.

(10) Patent No.: US 11,576,245 B1
(45) Date of Patent: Feb. 7, 2023

(54) COMPUTERIZED ADJUSTMENT OF LIGHTING TO ADDRESS A GLARE PROBLEM

(71) Applicant: International Business Machines Corporation, Armonk, NY (US)

(72) Inventors: Shailendra Moyal, Pune (IN); Venkata Vara Prasad Karri, Visakhapatnam (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 26 days.

(21) Appl. No.: 17/460,819

(22) Filed: Aug. 30, 2021

(51) Int. Cl.
| | |
|---|---|
| *H05B 47/12* | (2020.01) |
| *H05B 47/135* | (2020.01) |
| *H05B 47/165* | (2020.01) |
| *G05B 19/418* | (2006.01) |
| *G09G 5/10* | (2006.01) |

(52) U.S. Cl.
CPC ......... *H05B 47/12* (2020.01); *G05B 19/4183* (2013.01); *G09G 5/10* (2013.01); *H05B 47/135* (2020.01); *H05B 47/165* (2020.01); *G05B 2219/2642* (2013.01); *G09G 2320/0626* (2013.01)

(58) Field of Classification Search
CPC .... H05B 47/12; H05B 47/135; H05B 47/165; G05B 19/4183; G05B 2219/2642; G09G 5/10; G09G 2320/0626
See application file for complete search history.

(56) References Cited

U.S. PATENT DOCUMENTS

| | | | |
|---|---|---|---|
| 10,887,351 | B2 | 1/2021 | Nanda |
| 2015/0222996 | A1 | 8/2015 | Chu |
| 2017/0054935 | A1 | 2/2017 | Bostick |
| 2018/0139565 | A1 | 5/2018 | Norris |
| 2019/0051304 | A1 | 2/2019 | Tian |
| 2019/0384232 | A1* | 12/2019 | Casey ................... G06T 7/0002 |
| 2020/0160857 | A1* | 5/2020 | Alameh .................. G10L 15/22 |
| 2021/0081749 | A1 | 3/2021 | Claire |
| 2021/0118410 | A1* | 4/2021 | Grieves ................. G06F 3/0485 |
| 2021/0134299 | A1 | 5/2021 | Bender |
| 2021/0193176 | A1 | 6/2021 | Doshi |

FOREIGN PATENT DOCUMENTS

WO    WO-2021033785 A1 *  2/2021  ........... G05B 19/042

OTHER PUBLICATIONS

Disclosed Anonymously, "Intelligent Voice Assistant Extended Through Voice Relay System", ip.com Prior Art Database Technical Disclosure, IPCOM000255132D, Sep. 4, 2018, 23 pgs.

* cited by examiner

*Primary Examiner* — Daniel D Chang
(74) *Attorney, Agent, or Firm* — David B. Woycechowsky

(57) ABSTRACT

Technology for use by a human user in a viewing environment that includes a plurality of Internet of Things (IoT) light sources. Responsive to a voice command from a human user, machine logic determines which Internet of Things (IoT) light sources (for example, fixed brightness lamps, adjustable brightness lamps, windows with adjustable covers or shades) are causing glare problem by simulating a voice command throughout the entirety of a viewing environment. Once the problem light source(s) are determined, then the lighting is automatically adjusted to fix the glare problem.

18 Claims, 5 Drawing Sheets

COMPUTERIZED ADJUSTMENT OF LIGHTING TO ADDRESS A GLARE PROBLEM

BACKGROUND

The present invention relates generally to the field of voice commands used to direct the operations of computers (for example, smart devices).

The Wikipedia entry for "voice user interface" (as of Jul. 13, 2021) states, in part, as follows: "A voice-user interface (VUI) makes spoken human interaction with computers possible, using speech recognition to understand spoken commands and answer questions, and typically text to speech to play a reply. A voice command device (VCD) is a device controlled with a voice user interface. Voice user interfaces have been added to automobiles, home automation systems, computer operating systems, home appliances like washing machines and microwave ovens, and television remote controls. They are the primary way of interacting with virtual assistants on smartphones and smart speakers. Older automated attendants (which route phone calls to the correct extension) and interactive voice response systems (which conduct more complicated transactions over the phone) can respond to the pressing of keypad buttons via DTMF tones, but those with a full voice user interface allow callers to speak requests and responses without having to press any buttons. Newer VCDs are speaker-independent, so they can respond to multiple voices, regardless of accent or dialectal influences. They are also capable of responding to several commands at once, separating vocal messages, and providing appropriate feedback, accurately imitating a natural conversation . . . . Numerous challenges would have to be overcome, however, for such developments to occur. First, the VUI would have to be sophisticated enough to distinguish between input, such as commands, and background conversation; otherwise, false input would be registered and the connected device would behave erratically." (footnote(s) omitted)

SUMMARY

According to an aspect of the present invention, there is a method, computer program product and/or system for use by a human user in a viewing environment that includes a plurality of Internet of Things (IoT) light sources that performs the following operations (not necessarily in the following order): (i) receiving a viewing environment information data set including information indicative of: (a) the human user's identified position within the viewing environment and location, and (b) illumination status information for each IoT light source of the plurality of IoT light sources; (ii) receiving a voice command from the human user that indicates a glare problem with respect to the human user; (iii) determining, by machine logic, the location of a space within the viewing environment where the glare problem is being observed by the human user; and (iv) performs a trial and error approach to simulating the voice command in the entirety of the viewing environment to determine which problem light source(s) of the plurality of light sources is causing the glare problem based on the user's identified position, the location of the space where the glare problem is observed, the locations of the IoT light sources and the illumination statuses of the IoT light sources.

DETAILED DESCRIPTION

Figure 1:
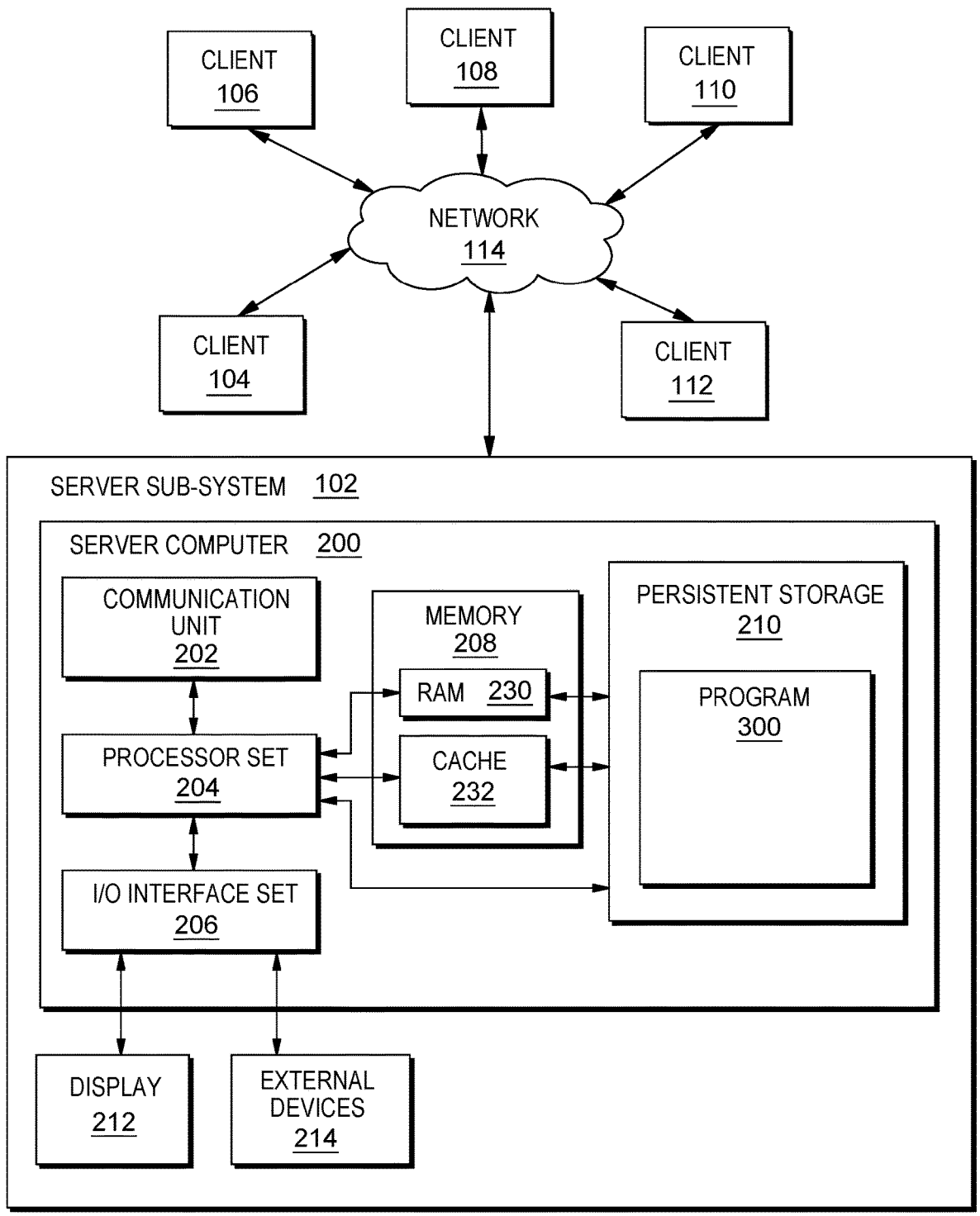
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figures 2, 3:
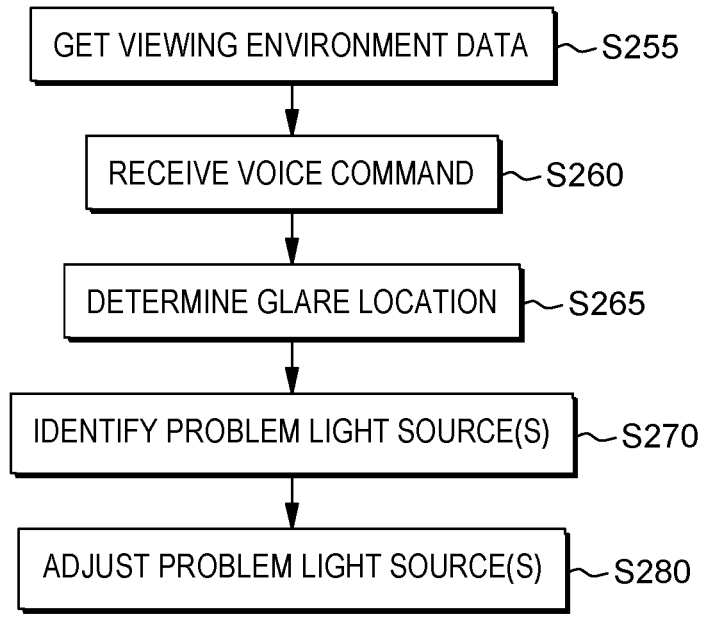
FIG. 2 is a flowchart showing a first embodiment method performed, at least in part, by the first embodiment system.
FIG. 3 is a block diagram showing a machine logic (for example, software) portion of the first embodiment system.
Figure 4:
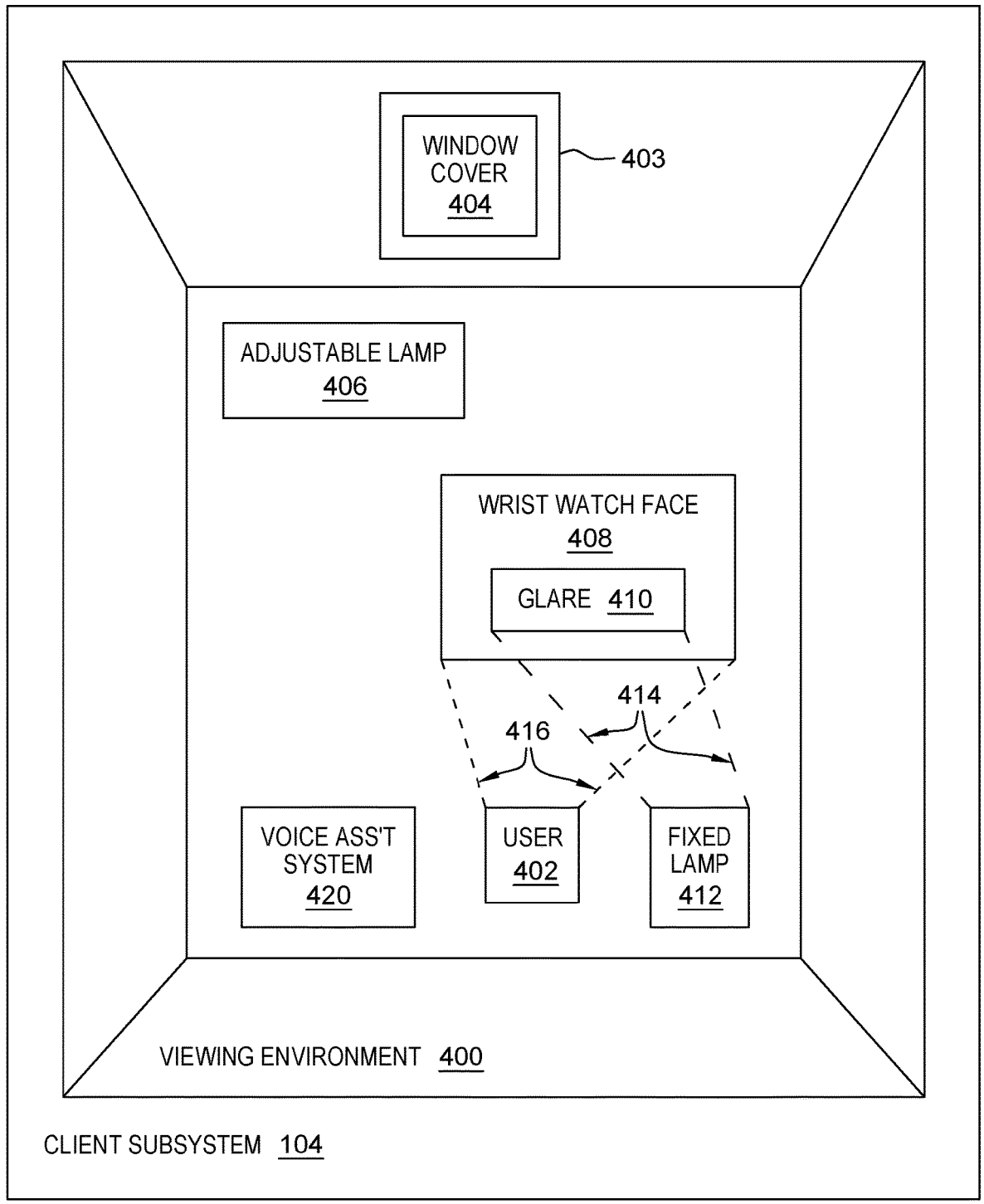
FIG. 4 is an orthographic top view of viewing environment included in the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3. This method of flowchart 250 is for use by a human user in a viewing environment that is represented by client subsystem includes a plurality of Internet of Things (IoT) light sources. More specifically, as shown in FIG. 4, client subsystem 104 includes viewing environment 400, which includes: user 402; IoT window 403 and window cover 404; adjustable lamp 406 (adjustable in its lumen output or brightness); wrist watch face 408; glare 410; fixed lamp 412; fixed lamp illumination zone 414; user's viewing vector zone 416; and voice assistant system 420 (also may sometimes referred to as a user device or user's device or user's computing device).

Processing begins at operation S255, where input module ("mod") 302 receives a viewing environment data set from voice assistant system 420 and through network 114. The viewing environment information data set includes: (a) an identified position(s) within the viewing environment where user 402 is located, and (b) location and illumination status information for each IoT light source of the plurality of IoT light sources 403, 406 and 412. In tis example, the illumination status for each light source is as follows: (i) window 403 is completely closed by cover 404 (and is therefore not a likely glare source); (ii) adjustable lamp is turned halfway up to its maximum brightness; and (iii) fixed lamp 412 is in the on state.

Processing proceeds to operation S260 where mod 302 receives a voice command from user 402 through voice assistant system 420 and network 114. The voice command that indicates a glare problem with respect to the human user.

Processing proceeds to operation S265, where glare location determination mod 304 determines, by its machine logic, the location of a space within the viewing environment where the glare problem is being observed by user 402. As shown in FIG. 4, glare 410 is caused for user 402 (characterized by viewing vector 416) by wrist watch face 408, which, in this example, is a spare wrist watch that is sitting idly on a countertop (not shown in FIG. 4).

Processing proceeds to operation S270, where problem light source(s) determination mod 306 performs a trial and error approach to simulating the voice command in the entirety of viewing environment 400 to determine which problem light source(s) of the plurality of light sources is causing the glare problem based on the user's identified position, the location of the space where the glare problem is observed, the locations of the IoT light sources and the illumination statuses of the IoT light sources. In this example, and as shown by illumination zone 414 of fixed lamp 412, it is fixed lamp 412 that is causing glare. It is not the covered window (because a covered window does not illuminate anything) and it is not adjustable lamp 406 (because lamp 406 is located so that it does not shine its light on wrist watch face 408.

Processing proceeds to operation S280, where output 308 adjusts the problem light source(s), in this example fixed lamp 412 is turned from on to off, to address the glare problem. In this example, automatically turning off IoT light source 412, by output mod 308, eliminates glare 310, thereby making user 402 more comfortable in her viewing environment 400.

III. FURTHER COMMENTS AND/OR EMBODIMENTS

Some embodiments of the present invention recognize the following facts, potential problems and/or potential areas for improvement with respect to the current state of the art: (i) current commercially available voice assistant systems use AI (artificial intelligence) to identify the direction of a voice command; (ii) the beam forming microphone can identify the location from where the voice command is submitted; (iii) the beam forming microphone can identify a location (the "location" may be in the form of a physical range of locations) of a user from where the voice command is submitted; (iv) based on the change in relative location/position of users field of view (FoV)/viewing direction, with respect to any target object in the surrounding, the user can view different objects, impressions or reflection of different objects, and the user may not know which object is creating the impression; and/or (v) the user may not be able to identify what voice command is to be provided.

Some embodiments of the present invention may include one, or more, of the following operations, features, characteristics and/or advantages: (i) identifies the context, based on the change in relative location/position of the users field of view (FoV)/viewing direction with respect to any target object in the surroundings; (ii) the user can view different objects, impression or reflection of different objects; (iii) the user may not know which object is creating the impression, and so the user may not be able to identify what voice command is to be provided and hence using beam forming technology enabled AI voice assistance system will be identifying if the user is submitting the command while standing or moving in the surrounding; and/or (iv) based on the mobility path of the user, the system will identify the voice command execution coverage area and executes the command.

Figure 5:
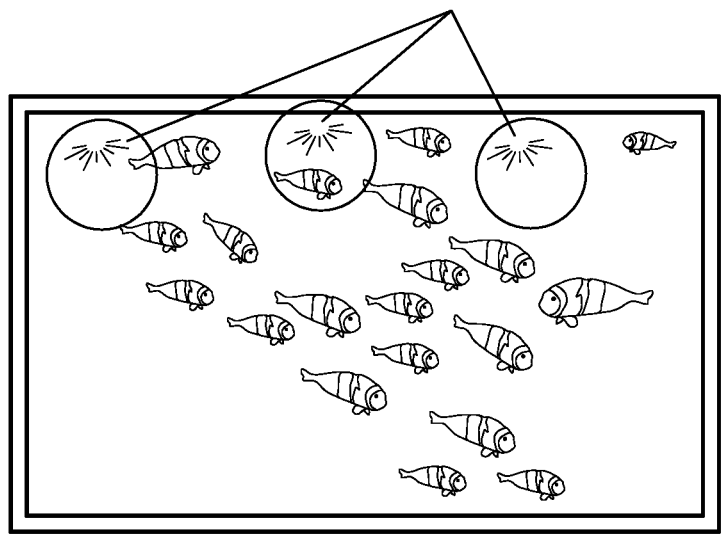
FIG. 5 is a first diagram of a second embodiment of a system according to the present invention.
Figure 5:
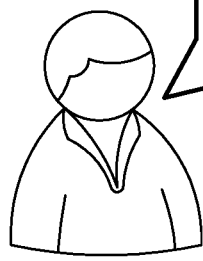

As shown in FIG. 5, diagram 500 is a first diagram that is helpful in understanding embodiments of the present invention. FIG. 5 shows a user who is watching TV from a particular direction. There is a problem because the user sees a reflection of light on the display. If the user wants to submit a voice command to the AI voice assistance to remove the reflection from the display, the AI voice assistance system will not be able to identify where the command is to be executed.

Figure 6:
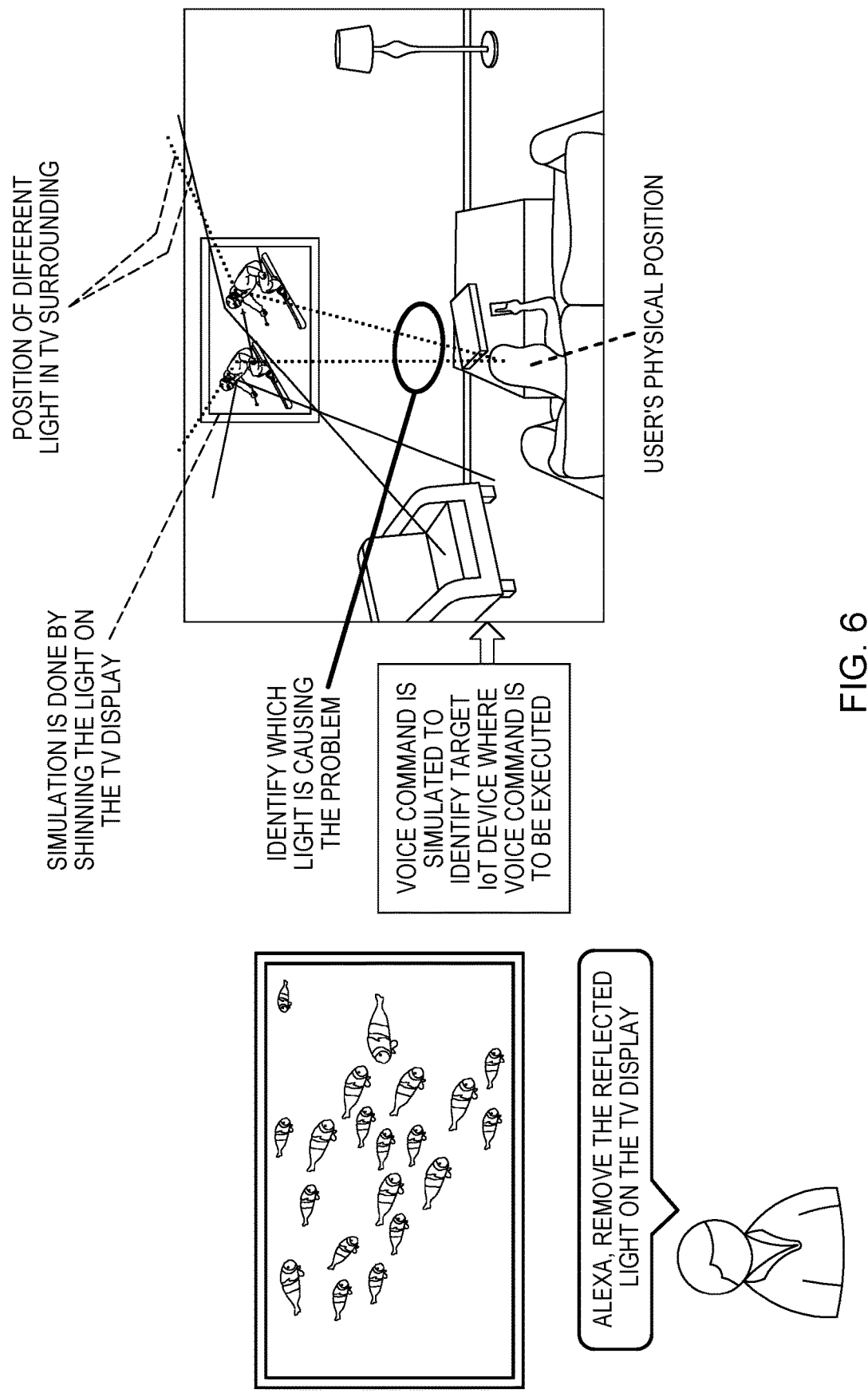
FIG. 6 is a second diagram of the second embodiment system.

As shown in FIG. 6, diagram 600 is a second diagram that is helpful in understanding various embodiments of the present invention. FIG. 6 shows a diagram 600 analyzing the direction aware command, and will execute the voice command based on a simulated result.

Some embodiments of the present invention may include one, or more, of the following operations, features, characteristics and/or advantages: (i) the user can submit direction aware voice commands and AI voice assistance system will identify the directional context; and/or (ii) the AI voice assistance system will consider the voice command execution.

Some embodiments of the present invention may include one, or more, of the following operations, features, characteristics and/or advantages: (i) while the user submits any voice command, a beam forming technology enabled AI voice assistance system will be identifying if the user is submitting the command while standing or moving in the surrounding, and accordingly based on the mobility path of the user, the system will identify the voice command execution coverage area; (ii) based on the context of the voice command (like reflection or light, sound, shadow position, etc.), relative position, and distance of different IoT (internet of things) enabled devices, the AI voice assistance system will simulate the users problem, and accordingly identify what action is to be executed; (iii) while simulating the users problem based on the user's voice command, the AI voice assistance system will gather the current state of different IoT enabled devices (like the light is on or off, sound is playing, etc.) and will identify what action is to be executed by the AI voice assistance system; and/or (iv) based on the users voice command, the AI voice assistance system will: (a) execute the voice command on a hit and trial basis, and/or (b) will consider the users feedback to ensure successful execution of the voice command (for example, after switching off a light, the AI voice assistance system will take feedback from the user if the reflection of light is removed or still exists, and gradually the appropriate command will be executed).

Some embodiments of the present invention may include one, or more, of the following operations, features, characteristics and/or advantages: (i) based on the users voice command, the smart TV will have a smart screen capture mechanism which will capture the image of the current video frame and, based on image processing, different objects can be identified that is, a reflection object, shadow or other objects, etc. (ii) once the objects are identified, feed can be shared with the smart voice assistance system to connect with the smart device within a field of angle or smart device similar to the identified object based on image processing; and/or (iii) the said embodiment is achieved by using/considering the users relative position, field of view, etc.

Some embodiments of the present invention may include one, or more, of the following operations, features, characteristics and/or advantages: (i) in any multi-user scenario, the system will analyze the directional context of the voice command from each of the users for a variety of contexts;

and/or (ii) the AI voice assistance system will simulate the problem for those various multi-user and multi device contexts and will be execute the correct voice command.

A method according to an embodiment of the present invention includes the following operations (not necessarily in the following order): (i) receiving, at a data processing device, a user contextual directional voice input that corresponds to more than one operation available for a data item displayed per context; (ii) searching a knowledge base that includes a usage history of the device, type of the device, and previous interactions with the device for the received voice input that corresponds to more than one available operation for each of the context; (iii) selecting, by the device, one of the corresponding operations associated with the data item; and (iv) simulating a variety of commands from all possible directions by considering context, user mobility, beam forming devices in the proximity, and accordingly display to the user where the command would be executed.

A method according to an embodiment of the present invention includes the following operations (not necessarily in the following order): (i) in any IoT enabled ecosystem, the physical position of each and every IoT devices will be identified; (ii) the IoT enabled ecosystem will identify the types of devices that are in the surrounding and the capacity of the IoT enabled devices; (iii) the home server will identify the dimension and surface texture of each of the IoT devices in the surrounding; (iv) the smart ecosystem will create a virtual model of the physical surrounding that includes position of the devices, dimension, capabilities, etc.; (v) in the IoT enabled ecosystem the ecosystem can have a beam forming microphone where the beam forming microphone will be enabled based on a specific wakeup command; and (vi) when any voice command is submitted by the user, the system will awake based on the wakeup command.

A method according to an embodiment of the present invention includes the following operations (not necessarily in the following order): (i) the beam forming microphone will identify the direction of submitted voice command; (ii) based on the analysis of the voice command and the beam forming microphone feed, the system will identify the direction and relative position of the user; (iii) when the voice command and the beam forming feed is submitted, the system will calculate the direction of the submitting voice command and the users field of view (FoV); (iv) the user can submit a voice command while moving and, accordingly based on the direction of voice command along with movement, the system will identify the total viewing coverage; (v) multiple users can submit the voice command from different directions, and accordingly, the beam forming system will identify the direction of focus of the users; (vi) when the user submits the voice command, the AI voice assistance system will identify if any directional context is present in the voice command; and (vii) the direction of the context voice command can be the users physical location-based voice command, like direction of light, reflection, shadow, etc.

A method according to an embodiment of the present invention includes the following operations (not necessarily in the following order): (i) when the voice command is submitted, the AI voice assistance system will identify the direction context on the voice command; (ii) the AI voice assistance system is already has the 3D (three dimensional) model of the physical surrounding; (iii) the system will identify the location context, like reflection of light, shadow, reflection of sound, etc.; (iv) the system will identify the current status of each of the IoT devices, such as the light is on/off, the sound is on/off, etc.; (v) the system will consider the simulated 3D model of the physical surrounding, current state of the IoT devices, direction of the voice command and context of the voice command, etc., and accordingly simulate the user's command; (vi) based on the simulated result, the system will identify what problem the user is having, such as which IoT device is creating the problem; and (vii) the system will execute the command at the target device based on the simulated result and the user's feedback, where the AI voice assistance system will execute the voice command in a hit and trial basis.

Some embodiments of the present invention may include one, or more, of the following operations, features, characteristics and/or advantages: (i) the system can be widely used in the retail business industry where the use cases with sound coming to buyers or consumers, and light reflections on products are causing an illusion instead of the user having the correct feeling of the product and/or (ii) utilizes artificial intelligence (AI) enabled voice assistance for identifying the directional context of a user's voice command for executing the voice command operations.

Some embodiments of the present invention may include one, or more, of the following operations, features, characteristics and/or advantages: (i) enhancing the digital/voice assistants; (ii) identifies the context based on the change in relative location/position of the users field of view (FoV)/viewing direction with respect to any target object in the surrounding; (iii) the user can view different objects, impressions, or reflection of different objects where the user may not know which object is creating the impression, and thus the user may not be able to identify what voice command is to be provided and hence, using a beam forming technology enabled AI voice assistance, the system will identify if the user is submitting the command while standing or moving in the surrounding, and accordingly based on the mobility path of the user, the system will identify the voice command execution coverage area and executes the command; (iv) references to a feature of simulating the user's problems, based on the context of the received voice commands, are not required; and/or (v) identifies actions to execute the operations of the voice commands for each of those identified contexts, are not required.

Some embodiments of the present invention may include one, or more, of the following operations, features, characteristics and/or advantages: (i) the user can submit direction aware voice commands and the AI voice assistance system will identify the directional context; (ii) the system will consider the same as item (i) above for voice command execution; (ii) the identification of the directional context will be used to find the device based on multiple attributes; and/or (iii) the system will be used to execute the voice command submitted by the user.

Some embodiments analyze a voice command related to any reflected light obstacle on any display, identifying the users viewing direction or command submitted direction, to calculate from where the reflected light can create problems to the user and accordingly, the AI system can control those light sources.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) method for use by a human user in a viewing environment that includes a plurality of Internet of Things (IoT) light sources, the CIM comprising:
   receiving a viewing environment information data set including information indicative of: (a) the human user's identified position within the viewing environment and location, and (b) illumination status information for each IoT light source of the plurality of IoT light sources;
   receiving a voice command from the human user that indicates a glare problem with respect to the human user;
   determining, by machine logic, the location of a space within the viewing environment where the glare problem is being observed by the human user; and
   performs a trial and error approach to simulating the voice command in the entirety of the viewing environment to determine which a first IoT light sources of the plurality of IOT light sources is causing at least a portion of the glare problem based on the user's identified position, the location of the space where the glare problem is observed, the locations of the plurality of IoT light sources and the illumination statuses of the plurality of IoT light sources.

2. The CIM of claim 1 further comprising:
   adjusting the first IoT light sources to address at least a portion of the glare problem.

3. The CIM of claim 2 wherein the adjustment includes adjustment of the brightness level of at least one of the first IoT light sources.

4. The CIM of claim 2 wherein the adjustment includes turning off the first IoT light sources.

5. The CIM of claim 2 wherein the adjustment includes covering the first IoT light sources, wherein the first IoT light source is in the form of windows.

6. The CIM of claim 1 wherein the received position of the human user is a dynamic position that is expressed as a physical range of locations within the viewing environment.

7. A computer program product (CPP) for use by a human user in a viewing environment that includes a plurality of Internet of Things (IoT) light sources, the CPP comprising:
   a set of storage device(s); and
   computer code stored collectively in the set of storage device(s), with the computer code including data and instructions to cause a processor(s) set to perform at least the following operations:
      receiving a viewing environment information data set including information indicative of: (a) the human user's identified position within the viewing environment and location, and (b) illumination status information for each IoT light source of the plurality of IoT light sources,
      receiving a voice command from the human user that indicates a glare problem with respect to the human user,
      determining, by machine logic, the location of a space within the viewing environment where the glare problem is being observed by the human user, and
      performs a trial and error approach to simulating the voice command in the entirety of the viewing environment to determine which a first IoT light sources of the plurality of IOT light sources is causing at least a portion of the glare problem based on the user's identified position, the location of the space where the glare problem is observed, the locations of the plurality of IoT light sources and the illumination statuses of the plurality of IoT light sources.

8. The CPP of claim 7 wherein the computer code further includes instructions for causing the processor(s) set to perform the following operation(s):
   adjusting the first IoT light source to address at least a portion of the glare problem.

9. The CPP of claim 8 wherein the adjustment includes adjustment of the brightness level of at least one of the first IoT light source.

10. The CPP of claim 8 wherein the adjustment includes turning off the first IoT light source.

11. The CPP of claim 8 wherein the adjustment includes covering the first IoT light source, wherein the first IoT light source is in the form of windows.

12. The CPP of claim 7 wherein the received position of the human user is a dynamic position that is expressed as a physical range of locations within the viewing environment.

13. A computer system (CS) for use by a human user in a viewing environment that includes a plurality of Internet of Things (IoT) light sources, the CS comprising:
   a processor(s) set;
   a set of storage device(s); and
   computer code stored collectively in the set of storage device(s), with the computer code including data and instructions to cause the processor(s) set to perform at least the following operations:
      receiving a viewing environment information data set including information indicative of:
      (a) the human user's identified position within the viewing environment and location, and
      (b) illumination status information for each IoT light source of the plurality of IoT light sources,
      receiving a voice command from the human user that indicates a glare problem with respect to the human user, determining, by machine logic, the location of a space within the viewing environment where the glare problem is being observed by the human user, and performs a trial and error approach to simulating the voice command in the entirety of the viewing environment to determine which a first IoT light sources of the plurality of IOT light sources is causing at least a portion of the glare problem based on the user's identified position, the location of the space where the glare problem is observed, the locations of the plurality of IoT light sources and the illumination statuses of the plurality of IoT light sources.

14. The CS of claim 13 wherein the computer code further includes instructions for causing the processor(s) set to perform the following operation(s):

adjusting the first IoT light source to address at least a portion of the glare problem.

15. The CS of claim 14 wherein the adjustment includes adjustment of the brightness level of at least one of the first IoT light source.

16. The CS of claim 14 wherein the adjustment includes turning off the first IoT light source.

17. The CS of claim 14 wherein the adjustment includes covering the first IoT light source, wherein the first IoT light source is in the form of windows.

18. The CS of claim 13 wherein the received position of the human user is a dynamic position that is expressed as a physical range of locations within the viewing environment.

* * * * *